(12) United States Patent
Struschka et al.

(10) Patent No.: US 7,637,999 B2
(45) Date of Patent: Dec. 29, 2009

(54) FLUIDIZED BED REACTOR

(75) Inventors: Manfred Struschka, Auggen (DE);
Winfried Thomann, Binzen (DE);
Jochen Dressler, Mietingen (DE)

(73) Assignee: Glatt Process Technology GmbH, Binzen (DE)

( * ) Notice: Subject to any disclaimer, the term of this patent is extended or adjusted under 35 U.S.C. 154(b) by 728 days.

(21) Appl. No.: 11/282,118

(22) Filed: Nov. 16, 2005

(65) Prior Publication Data

US 2006/0124054 A1 Jun. 15, 2006

Related U.S. Application Data

(63) Continuation of application No. PCT/EP2004/005243, filed on May 14, 2004.

(30) Foreign Application Priority Data

May 16, 2003 (DE) ................. 103 23 089

(51) Int. Cl.
*B05C 5/00* (2006.01)
*B05C 11/06* (2006.01)
*B01J 8/18* (2006.01)
*A23G 3/26* (2006.01)

(52) U.S. Cl. ............... 118/303; 118/62; 118/19; 118/24; 422/139

(58) Field of Classification Search ............ 118/303, 118/19, 24, 62, DIG. 5; 427/185, 213; 239/135; 34/582, 585, 588; 422/187, 139
See application file for complete search history.

(56) References Cited

U.S. PATENT DOCUMENTS

| | | | | |
|---|---|---|---|---|
| 4,217,851 A | * | 8/1980 | Biehl et al. | ............ 118/20 |
| 4,858,552 A | | 8/1989 | Glatt et al. | |
| 5,132,142 A | * | 7/1992 | Jones et al. | ............ 427/196 |
| 5,236,503 A | * | 8/1993 | Jones | ............ 118/303 |
| 5,437,889 A | | 8/1995 | Jones | |
| 5,632,102 A | * | 5/1997 | Luy et al. | ............ 34/582 |
| 6,579,365 B1 | * | 6/2003 | Jones et al. | ............ 118/303 |

FOREIGN PATENT DOCUMENTS

| | | |
|---|---|---|
| DE | 34 30 633 A1 | 2/1986 |
| DE | 36 09 133 A1 | 9/1987 |
| EP | 0 597 092 A1 | 5/1994 |
| EP | 1 295 633 A1 | 3/2003 |
| JP | 63 274445 A | 11/1988 |
| WO | WO-01/37980 A2 | 11/2000 |

OTHER PUBLICATIONS

Patent Abstracts of Japan, vol. 2003, No. 05, May 12, 2003, & JP 2003 001090 A (Pauretsuku:KK), Jan. 7, 2003.
Patent Abstracts of Japan, vol. 1999, No. 05, May 31, 1999 & JP 11 033386 A (Kawasaki Heavy Ind Ltd), Feb. 9, 1999.

* cited by examiner

*Primary Examiner*—Yewebdar T Tadesse
(74) *Attorney, Agent, or Firm*—Darby & Darby PC

(57) ABSTRACT

A fluidized bed reactor for granulating and coating particles in very small amounts having an essentially conical product container, a filter housing with filters inserted above the product container, and a lower housing below the conical product container having a process air supply. The product container has a sieve bottom in the center of which is a height-adjustable two-component nozzle. At least one guide element associated with the sieve bottom directs at least part of the process air to the two-component nozzle in a radial manner.

20 Claims, 4 Drawing Sheets

FLUIDIZED BED REACTOR

This application is a continuation of PCT Application No. PCT/EP2004/005243, designating the United States and having an International filing date of May 14, 2004, which is incorporated by reference herein in its entirety.

BACKGROUND OF THE INVENTION

The invention relates to a fluidized bed device for granulating and coating particles in very small quantities.

Fluidized bed installations for granulating and coating particles are generally known, wherein these installations comprise a container to which particles to be coated are added, said particles being fluidized in a directed gas flow. One or more spray nozzles for spraying in substances, e.g., fluid and/or powder-like substances, with which the fluidized particles are to be coated, are attached to the container. Filters are provided in order to remove the process gas without entraining the particles. Such installations serve for processing particles in the large quantities and do not work for smaller quantities.

The problem with the processing small quantities is that with pneumatic transport some particles are carried away by the fluidization flow. With known fluidized bed installations these small quantities are an accepted material loss.

Furthermore, the material sticks to the walls or the bottom of the container, wherein with conventional processes with larger product quantities, the product adhesions are cleaned away by the fluidized product itself.

SUMMARY OF THE INVENTION

It is therefore the object of the invention to create a fluidized bed device for the smallest quantities of product particles which has an extremely high efficiency and with which the solid particles may be coated in an as complete and uniform manner as possible.

The fluidized bed device according to the invention amongst other things comprises a generally cone-like product container with a sieve bottom in which centrally, a two-component nozzle is inserted, which may be adjusted in it height with respect to the sieve bottom depending on the product to be processed and the processing manner. At least one guide element is allocated to the sieve bottom, and this element leads the processing air with a radial component at least partly into the direction of the two-component nozzle. On account of leading the air and flow and the possibility of setting the nozzle in the nozzle holder in its height in an adjustable manner, small quantities of a product which have or must obtain different trajectory and dryness properties and electrostatic properties may be processed in a gentle manner. A good adaptation to the process type, e.g., coating/granulation and to the properties of the product is possible by way of the adjustment ability of the two-component nozzle, as the case may be, with a partial exchangeability of the nozzle holder with different diameters of the discharge opening of the at least one air guide channel. Due to the directed incident flow of air on the sieve bottom, it is ensured that the product does not build up at any location of the bottom and thus takes part in the process. As a whole, a uniform granulation and coating result is achieved, wherein an over-humidification of the solid matter particles may be counteracted due to the adjustability of the two-component nozzle and, as the case may be, the exchangeability of the nozzle holder, e.g., of an annular cap comprising the air guide channel.

The guide element may be designed as a flange that is integrally formed, for example, and may be provided radially inwardly on the lower part of the product container, which forms a gap between the sieve bottom and the flange with an opening directed to the two-component nozzle for the radial direction of the air. The guide element may also be an annular insert. The nozzle holder may be a straight or curved cone in the region projecting into the process container. The direction of the particles with respect to the spray cone produced by the two-component nozzle is thus improved. The guiding of the particles in the return flow towards the nozzle is likewise improved.

Thus in an advantageous manner, the process air is divided up into three components, main process air which flows through the free surface (area) of the sieve bottom, first part process air which flows radially inwards in the gap, and second part process air which flows coaxially around the nozzle into the product container.

The flight path of the particles may be extended by the provision of a transition housing between the product container and the filter housing, so that an adhesion to the filters in the filter housing is reduced.

A charging device may applied in the wall of the filter housing or of the transition housing, which comprises a sealing receiver for a supply container of the initial product. This charging device may be designed such that the supply container is closed in a first position, and in a second position is connected to the inner space of the device. A dust-free and low-contamination filling of the installation in continuous operation, and a closed aseptic control of the process is possible by way of this. The installation additionally, on account of its overall size, may be set up in a closed hood, so that laminar flow conditions of the air may be achieved in the environment of the installation, which remove contamination particles of the air in a targeted manner.

The charging device may be designed in a revolver-like manner, i.e., several supply containers may be fastened on a drum and one of the containers is connected to the inner space.

The filter housing and/or the transition housing is in active connection with a shaking device, by which means adhesions to the walls of the housing may be detached.

By way of the fact that the individual housing parts may be connected to one another by way of releasable quick-connection, the device may be dismantled into its individual parts and reassembled without any difficulty and in a quick manner, by which a simple cleaning ability is provided, as well as the conditions for aseptic processing due to the additional autoclaving ability.

BRIEF DESCRIPTION OF THE DRAWINGS

The foregoing and other features of the present invention will be more readily apparent from the following detailed description and drawings of illustrative embodiments of the invention where like reference numbers refer to similar elements throughout and in which.

DESCRIPTION OF EMBODIMENTS OF THE INVENTION

Figure 1:
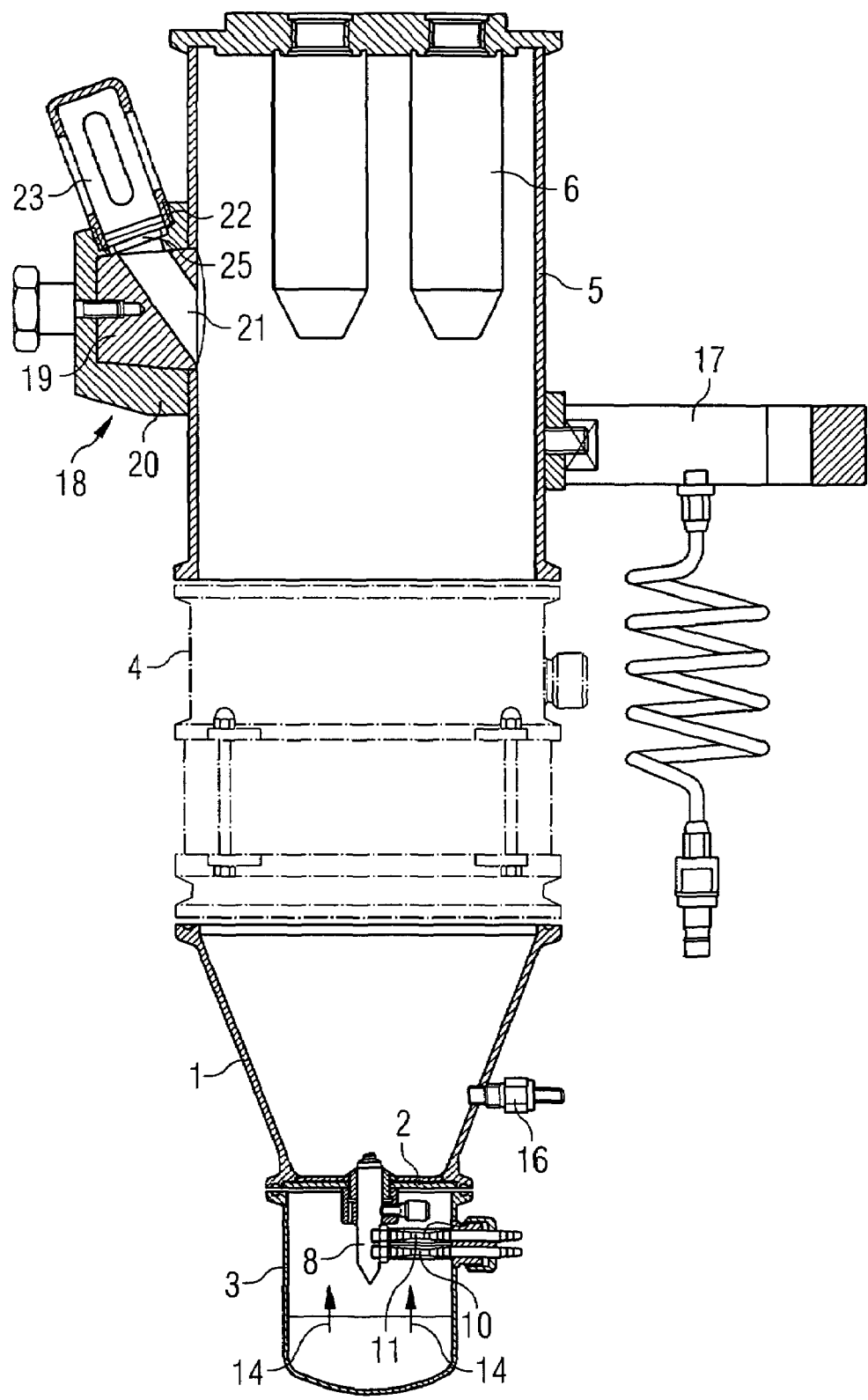
FIG. 1 shows a lateral view of the fluidized bed device according to an embodiment of the invention.

The device represented in FIG. 1 as its main constituents comprises a generally funnel-like product container 1 that via a sieve bottom 2 is connected to a lower part 3. An optional transition housing 4 may be arranged above the funnel-like product container. This is indicated by the dot-dash representation. Furthermore, a filter housing 5 may be arranged above the transition housing 4, into which filters 6, for example, metal filters, are inserted. However other types of filters may also be used. The product container 1, the lower part 3, the transition housing 4 and filter housing 5 may be releasably connected to one another, e.g., using releasable quick-connections such a clamp/clip connections which for example are designed from clamping rings engaging over the outer edges of the various housing parts. Certain embodiments may have sealing rings (not shown) inserted between the parts.

Figure 2:
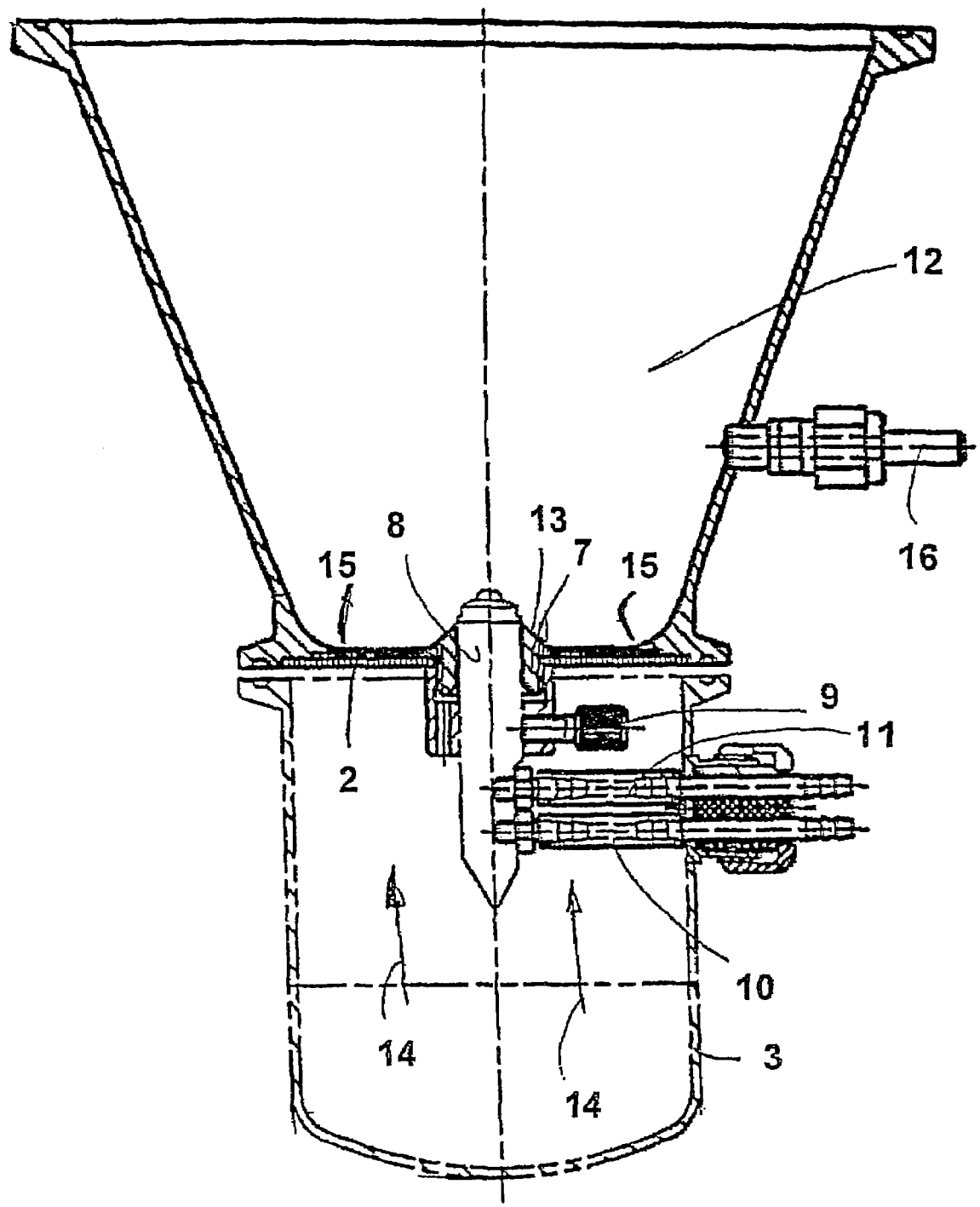
FIG. 2 shows an enlarged view of a product container with an inserted nozzle according to an embodiment of the invention.
Figure 3:
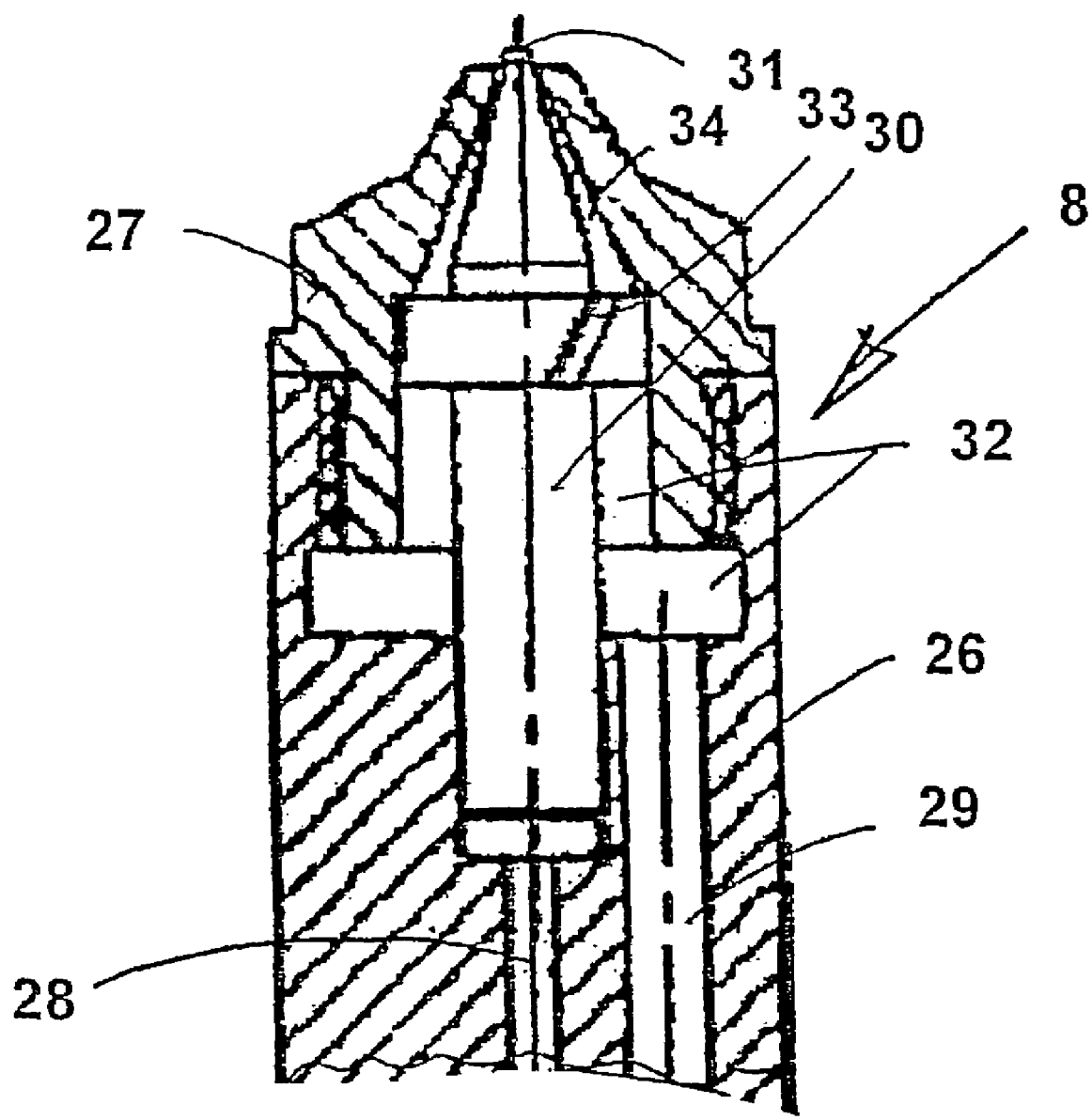
FIG. 3 shows a partial section of a two-component nozzle according to an embodiment of the invention.

As may be recognized in more detail in FIG. 2, a nozzle holder 7 is applied centrally into the sieve bottom 2, and a spray nozzle 8 designed as a two-component nozzle is adjustably fastened in this holder. The knurled-head screw 9 which engages through the nozzle holder 7 and firmly clamps the spray nozzle 8 permits adjustability. Alternatively, the height of the two-component nozzle 8 may also be adjusted by way of mechanical or electromechanical adjustment. In various embodiments the adjustment may be done during the processing, and a viewing opening may be provided.

The spray nozzle 8 is connected to a flexible atomization air supply 10 and to a flexible spray fluid supply 11 which on the one hand are fastened on the housing of the lower part 3 and on the other hand on the spray nozzle 8 by way of screw connections. These supplies 10, 11 are connected to the corresponding material sources.

Figure 4:
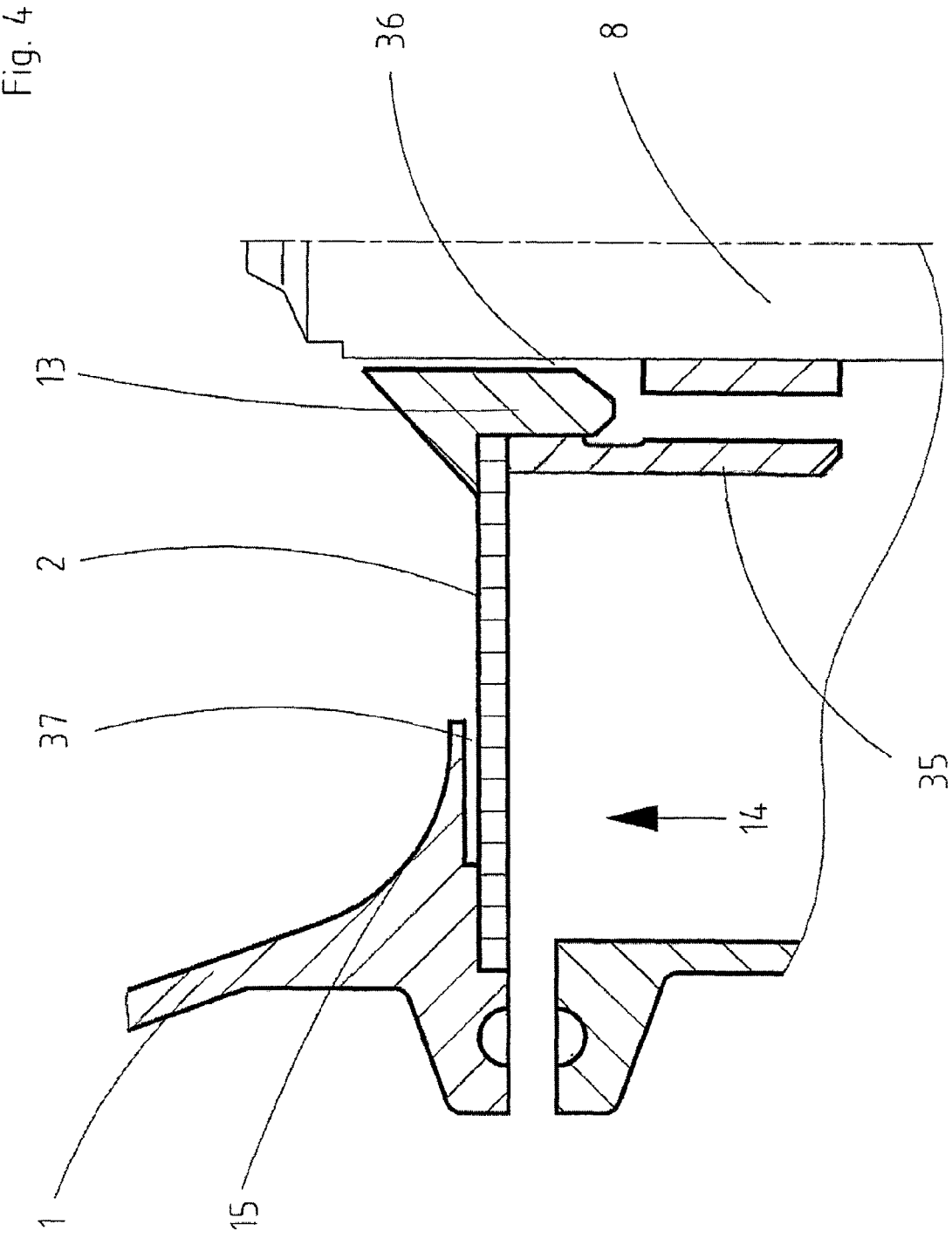
FIG. 4 an enlarged partial section of the bottom region of a product container according to an embodiment of the invention.

As should be recognized in FIG. 2 and FIG. 4, the spray nozzle 8 and a part of the holder 7 project into the inner space 12 of the product container 1 and the nozzle holder 7 which is coaxial to the nozzle axis is designed as a cone in this projecting region, where appropriate the holder may have a surface provided with a convex or concave curvature. The nozzle holder 7 consists of two parts, of an annular cap 13 and a lower screw connection 35, which may be screwed to one another from the product container 1 and the lower part 2, in a manner which clamps in the edges of the sieve bottom 2. As may be recognized, the holder 7 is provided with channels through which process air 14 may flow into the holder 7 from below. The channels guide the process air through the holder in a manner such that it exits next to the spray nozzle 8 and may contribute to directing the particles. An annular channel 36 is provided in the embodiment example, which lies in the direct vicinity of the spray nozzle 8. The annular cap 13 is exchangeable and may thus comprise different diameters of the annular channel 36, in order to be adapted to the respective process conditions.

The lower part 3 comprises a supply for process air (not shown) as known by those of skill in the art for carrying out the process with the suction or pressure methods, which is indicated by the arrows 14. The sieve bottom 2 is applied into a recess on the lower side of the product container and is fastened by the lower part 3 in the represented position.

The product container may be provided with rounded contours in the transition region between the container wall and the bottom, which encourage a uniform air flow. Of course other components may be provided for leading the air and the flow as are known.

A guide element 15 (see FIG. 4) may be arranged above the sieve bottom 2, and at least partly deflects the process air 14 flowing upwards through the sieve bottom 2 into a radial direction in a manner such that an air flow directed to the nozzle 8 with a radial component arises. One should recognize from the detailed view of FIG. 4 that the guide element 15 in that embodiment is designed as an annular flange-like projection that is integrally formed onto the wall together with the curved transition region on the lower part of the product container 1. Seen in cross section, the guide element 15 is tongue-shaped and a gap 37 arises between the sieve bottom 2 and the guide element 15, said gap comprising an opening directed towards the spray nozzle 8. The process air 14 entering through the sieve bottom in the edge region is deflected on the lower side of the guide element 15 and a flow with a radial component arises.

Thus apart from the atomization flow, three air flow components are present, which are derived from the process air and which support the process: the actual main process air, the radial flow through the gap 37 and the flow through the annular channel 36. With this embodiment, the gap 37 has a height of 1 mm. The width of the annular channel 36 of the annular cap 13 may lie between 1/10 and 2 mm.

A temperature probe 16 may be applied into the container wall for measurement of the process temperature in the product container.

The inventive device may also be equipped with a shaking device or a mechanical beater 17. In the shown embodiment this is a pneumatic vibrator fastened on the wall of the filter housing 5, and activated in an intermittent manner to detach the adhering product from the walls.

Furthermore a charging means 18 for the initial product may be provided, which comprises a connecting piece 19 inserted into the housing wall and a sleeve 20 that is rotatably connected to the projecting piece. A connection channel 21 to the inner space of the filter housing 5 is incorporated in the connecting piece 19, and the sleeve 20 comprises a receiver 22 for a container 23 with an initial product. The receiver 22 is provided with a thread and a sealing ring 24, wherein the container 23 which is preferably designed as a dispensing glass comprises a corresponding thread in a manner such that it may be screwed into the receiver 22. In the shown condition which shows the charge position, the inside of the container 23 is connected to the channel 21 and thus to the inner space of the filter housing 5. The sleeve 20 is rotatable into a position offset by 180°, in which the glass or the container 23 with its opening points upwards but the connecting piece 19 closes the opening. The charging means is designed such that in the closed condition it also withstands an excess pressure occurrence which may possibly occur in the installation, without giving out any of the product to the environment. Likewise for safety reasons, the glass may be encapsulated with a stainless steel casing. Thus the arrangement is capable of withstanding excess pressure eventualities during the filling procedure.

With another embodiment example, the charging means may be designed in the manner of a revolver, wherein several receivers 22 are provided on the sleeve 20 distributed over the periphery, of which however only one in each case is connected to the connection channel 21. Thus several different starting materials and/or equal materials may be introduced at different times.

A part of the spray nozzle 8 is shown in FIG. 3. It comprises a base body 26 and an insert 27 which is sealingly inserted into the base body. Channels 28, 29 for supplying spray fluid or atomization air are incorporated into the base body, wherein the spray nozzle channel is connected to a nozzle tip 30 which comprises a nozzle opening 31 for the spray fluid, and the insert 27 engages over this nozzle tip 30. The atomization air channel 29 ends in an annular space 32 provided around the nozzle tip 30, from where the atomization air is led through a channel 33 in the nozzle tip 30 into an annular gap 34 in a manner such that the atomization air exiting from the annular gap 34 surrounds and entrains the spray fluid exiting out of the nozzle opening.

The manner of functioning and the operation of the fluidized bed device are as follows. With the start of the process, firstly the complete process chamber consisting of the housing parts 3, 1, where used 4, 5 and a housing part which may be placed onto the filter housing 5 and realizes the removal of air, may be conditioned by way of the "main process air" 14 such that the maximal temperature difference between the incoming air and the outgoing air is minimized, e.g., one Kelvin. The process chamber remains can empty during this conditioning and no starting material is introduced and also fluid is not yet sprayed. By way of this, it is ensured that no temperature gradient to the process air arises on the container walls, by which means condensation procedures or adhesion of the product to the container wall does not occur.

After the conditioning, starting material (carrier materials such as e.g., sugar, in particular lactose, sacharrose, mannitol, sorbitol or also trehalose) is fed to the process chamber in a targeted manner via the charging device 18. With the charging device on the side wall, the product gets into the region of influence of the atomized air flow produced by the spray nozzle 8. The charging is effected with a closed installation and when the process air continues, i.e., the process of the conditioning is not interrupted. Due to the design of the charging device 18, it is ensured that it is indeed the complete start quantity is subjected to the process without losses. It is envisaged for different start quantities between perhaps 2 and e.g., 100 g to be able to be supplied. This is possible since differently large dispensing glasses may be used with the charging device, wherein the start quantities are filled or directly weighed out into the container 23 designed as a commercially available snap-on lid glass. This glass 23 with the opening at the top is snapped into the receiver 22 of the sleeve 20, wherein the charging device 18 is then locked in a position which is pivoted by 180° to the position in FIG. 1. On filling, the sleeve 20 is rotated into the position shown in FIG. 1, wherein the glass 23 is positioned exactly over the oblique channel 21. The starting material is conveyed quantitatively into the process chamber and after the filling procedure, the sleeve is rotated back into the initial position. After this, the dispensing glass is weighed back, in order to ascertain the exact quantity of the starting material which has really been supplied. This is very important with very small quantities which are to be processed.

Several fixed intermediate positions are possible with a revolver-like charging device, and the sleeve 20 may be rotated in each case about an angular section which is defined by the number of receivers.

The spraying procedure may begin after the starting material has been dispensed and as long as no temperature differences between the incoming air temperature and outgoing air temperature continue to be present. With the actual spray procedure, one may differentiate between the process types of granulation and coating by way of the process parameters and the adjustability and exchangeability of the spray nozzle 8 which has been specified above.

In particular, at the beginning of the process and on conditioning the installation when the product has only just been filled without any fluid, the dry particles tend to electrostatically charge and thus tend to attach to the container wall, so that it is particularly in this condition that the beater 17 is actuated.

The introduced solid matter particles on account of the arising air flow in the edge region of the process chamber fall downwards and get into the product container 1. In the lower part of the product container the particles are led to the nozzle on account of the radial component arising at the sieve bottom 2, and at the nozzle are accelerated upwards. During the acceleration, the particles are heated and a drying takes place. The particles accelerated upwards pass the spray cone that is produced by the two-component nozzle 8 with a concurrent flow and at a distance to the nozzle tip. In this contact region the spray cone has already completely formed and is very uniform, so that an excess humidification of the solid matter particles does not occur. After a certain flight path upwards, the flow speed is so low that the particles turn back and fall again in the direction of the product container 1 and the sieve bottom 2 where in turn they forcibly lead the air cushion again in the direction of the nozzle. Individual particles attach to the filters and as the case may be are led to the process again by way of blow-off pulses.

On granulation, the introduced powder-like starting material should be built up into granulates in a targeted manner. Such granulates then have the typical granulate properties, e.g., pourable (floatable), free of dust, and capable of being dosed. At the same time the spray fluid ejected out of the nozzle 8 must contain a binding agent (e.g., HPMC, PVP), by which means the bonding together of the individual staring nuclei is ensured. Mostly an active substance is contained in the spray fluid which in this manner is embedded in the granulate in a targeted manner. To be understood as an active substance includes a pharmaceutical active ingredient for example, which may be within the scope of laboratory development, is not yet available in large quantities and simultaneously is very expensive, or biopharmaceutical active ingredients such as, e.g., proteins which are either present in the human or animal organism and accordingly need to be extracted, or which may be manufactured in a recombinant manner.

With the coating process presented, fluidized particle-like material or granulate that has already been previously processed is coated with a defined layer. Some uses of the coating are, e.g., to cover an undesired taste, to achieve a targeted protection of the core material from external influences, or to achieve a targeted release behavior for pharmaceutical active ingredients.

The fluidized bed device in its dimensions is adapted to the smallest quantities, for example the product container may have a volume of one liter. With these very small quantities, the atomization from the bottom to the top is meaningful and important as has been described above.

Those skilled in the art will recognize that the materials and methods of the present invention will have various other uses in addition to the above described embodiments. They will appreciate that the foregoing specification and accompanying drawings are set forth by way of illustration and not limitation of the invention. It will further be appreciated that various modifications and changes may be made therein without departing from the spirit and scope of the present invention, which is to be limited solely by the scope of the appended claims.

What is claimed is:

1. A fluidized bed device for granulating and coating particles in very small quantities, comprising:
   at least one generally cone-shaped product container,
   a filter housing arranged above the product container, having inserted filters, and
   a housing lower part arranged below the product container and which has a process air supply, wherein the product container comprises a sieve bottom in which a two-component nozzle is generally centrally inserted, said two-component nozzle being adjustable in its height with respect to the sieve bottom, and at least one guide element extending partially above the sieve bottom, said at least one guide element is configured to deflect the process air flowing upward through the sieve bottom into a radial direction toward the two-component nozzle.

2. The fluidized bed device according to claim 1, wherein the two-component nozzle is inserted in a nozzle holder, which comprises at least one air guide channel fed with process air with selectable discharge opening dimensions.

3. The fluidized bed device according to claim 2, wherein the nozzle holder is provided with an exchangeable annular cap.

4. The fluidized bed device according to claim 2, wherein the nozzle holder projects above the sieve bottom into the product container, and the projecting portion thereof is one of generally cone-shaped, concave and convex.

5. The fluidized bed device according to claim 2, wherein the at least one air guide channel is an annular channel bordering the two-component nozzle.

6. The fluidized bed device according to claim 1, wherein the at least one guide element has an annular projection directed radially inwardly in a lower part of the product container and forms a gap with the sieve bottom that is open towards the two-component nozzle.

7. The fluidized bed device according to claim 1, wherein the height of the two-component nozzle and/or the discharge opening of the air guide channel in the nozzle holder is set depending on at least one of the quantity, density and shape of the particles.

8. The fluidized bed device according to claim 1, wherein the product container has a transition region at the bottom thereof formed for directing a return flow of particles in the direction of the two-component nozzle.

9. The fluidized bed device according to claim 8, wherein the transition region is rounded.

10. The fluidized bed device according to claim 1, sized for a product quantity of about 2 to 100 grams.

11. The fluidized bed device according to claim 10, sized for a product quantity of less than about 50 grams.

12. The fluidized bed device according to claim 1, further comprising a transition housing disposed between the product container and the filter housing.

13. The fluidized bed device according to one of the claim 1, further comprising a charging device having at least one receiver for a supply container containing particles.

14. The fluidized bed device according to claim 13, wherein the at least one receiver is arranged on a sleeve rotatable about a connecting piece, wherein the sleeve is rotatable between a first position in which the supply container is closed off from the fluidized bed device and a second position in which the supply container is in connection with the fluidized bed device.

15. The fluidized bed device according to claim 13, wherein the charging device has a plurality of receivers.

16. The fluidized bed device according to claim 1, further comprising a device for detaching particles that stick to the filter housing walls.

17. The fluidized bed device according to claim 1, wherein the product container is sealingly connected to the filter housing and the housing lower part by way of releasable connections.

18. A fluidized bed device for granulating and coating particles in very small quantities, comprising:
    at least one generally cone-shaped product container including a sieve bottom;
    a filter housing disposed above the product container and having at least one filter disposed therein;
    a housing lower part disposed below the product container, the housing lower part being supplied with process air;
    a two-component spray nozzle centrally disposed in the sieve bottom and adjustably extending into the product container; and
    at least one guide element disposed on the sieve bottom, the at least one guide element extending above the sieve bottom so as to form a gap between the sieve bottom and the at least one guide element and direct a portion of the process air toward the two-component spray nozzle.

19. The fluidized bed device according to claim 18, wherein the at least one guide element includes an annular projection extending inwardly above the sieve bottom and the gap is open towards the two-component spray nozzle.

20. The fluidized bed device according to claim 18, further comprising a nozzle holder disposed in the sieve plate and adjustably retaining the two-component nozzle therein, the nozzle holder including at least one air guide channel providing a portion of the process air to the product container.

* * * * *